United States Patent [19]

Nimura et al.

[11] Patent Number: 4,992,947
[45] Date of Patent: Feb. 12, 1991

[54] VEHICULAR NAVIGATION APPARATUS WITH HELP FUNCTION

[75] Inventors: Mitsuhiro Nimura; Shoji Yokoyama; Koji Sumiya; Shuzo Moroto, all of Anjo, Japan

[73] Assignees: Aisin Aw Co., Ltd., Anjo; Kabushiki Kaisha Shinsangyokaihatsu, Tokyo, both of Japan

[21] Appl. No.: 290,118

[22] Filed: Dec. 27, 1988

[30] Foreign Application Priority Data

Dec. 28, 1987 [JP] Japan .................. 62-333056

[51] Int. Cl.⁵ ............................................. G06F 15/50
[52] U.S. Cl. .................................... 364/444; 364/449; 73/178 R; 340/990; 340/995
[58] Field of Search ........... 364/443, 444, 449, 424.03; 73/178 R; 340/988, 990, 995

[56] References Cited

U.S. PATENT DOCUMENTS

| | | | |
|---|---|---|---|
| 4,376,298 | 3/1983 | Sokol et al. | 364/424.03 |
| 4,490,717 | 12/1984 | Saito | 340/995 |
| 4,679,147 | 7/1987 | Tsujii et al. | 340/995 |
| 4,763,270 | 8/1988 | Itoh et al. | 340/988 |
| 4,796,189 | 1/1989 | Nakayama et al. | 364/449 |
| 4,812,845 | 3/1989 | Yamada et al. | 340/988 |

*Primary Examiner*—Gary Chin
*Attorney, Agent, or Firm*—Varndell Legal Group

[57] ABSTRACT

A vehicular navigation apparatus, which is equipped with a help function, for outputting guidance information for travel to a desired destination includes an input unit having desired destination input means, present position input means and help function input means, a memory unit for storing desired destination information, and a display unit for outputting the guidance information in response to input information from the input unit, wherein the memory unit is provided with a non-volatile RAM, with necessary information being saved in an area of the non-volatile RAM when a help function is called by the help function input means. Help function items are provided for the following occasions: when the driver wishes to input or change a departure point and then depart from that point; when the driver wishes to change a desired destination while en route to a formerly set destination; when the driver strays off course while en route to a desired destination and cannot determine his present position without returning to the point at which the vehicle went off course; when a course cannot be travelled because of road construction or the like; when traffic becomes heavy and the driver wishes to change from one route to another to avoid congestion, and when the driver wishes to temporarily leave the course and then return to the course at the same point.

10 Claims, 24 Drawing Sheets

FIG. 6

NODE SERIES DATA

| NODE NO. | EAST LONGITUDE | NORTH LATITUDE | ATTRIBUTE |
|---|---|---|---|
| 0001 | 135,··· | 35,··· | 01 |
| 0002 | 135,··· | 35,··· | 00 |
| ⋮ | | | |

INTERSECTION LIST

| CODE NO. | INTERSECTION NAME | INTERSECTION NO. | LANDMARK | ATTRIBUTE | CONNECTING INTERSECTION NO.(1) | CONNECTING INTERSECTION NO.(2) |
|---|---|---|---|---|---|---|
| 0101 | GION | 10 | MARUYAMA PARK | 01 | 2147 | 2152 |
| 0102 | KITANO HAKUBAI-CHO | 398 | GASORLINE STATION | 00 | 59 | 3096 |
| | | | | | | |

FIG. 8

DESTINATION LIST

| CODE NO. | DESTINATION NAME | PARK-ING LOT NO. | CONNECTING INTER-SEC-TION NO. ① | CONNECTING INTER-SEC-TION NO. ② | PARK-ING LOT DIREC-TION | PHOTO-GRAPH NO. ① | PHOTO-GRAPH NO. ② | EXIT PHOTO NO. | BLOCK | EAST LONGI-TUDE | NORTH LATI-TUDE |
|---|---|---|---|---|---|---|---|---|---|---|---|
| 0001 | ARASHIYAMA | 1 | 2103 | 2097 | −1 | 1121 | 0 | 0 | 0A00 | 135,... | 35,... |
| 0012 | GINKAKU TEMPLE | 1 | 2153 | 2265 | +1 | 2019 | 2020 | 2021 | 0CFF | 135,... | 35,... |
| | | | | | | | | | | | |

ROAD DATA

| ROAD NO. | STARTING POINT INTERSECTION NO. | END POINT INTERSECTION NO. | NO. OF ROAD HAVING SAME STARTING POINT | NO. OF ROAD HAVING SAME END POINT | ROAD WIDTH | PROHIBITION ① | PROHIBITION ② | GUIDANCE UNNECESSARY | PHOTOGRAPH NO. | NUMBER OF NODES | LEADING ADDRESS OF NODE SERIES DATA |
|---|---|---|---|---|---|---|---|---|---|---|---|
| 1 | 1 | 2 | 7 | 4 | 1 | — | — | 3 | 1 | 15 | 100 |
| 2 | 2 | 1 | 3 | 8 | 1 | — | — | 7 | 2 | 13 | 200 |
| 3 | 2 | 3 | 2 | 3 | 2 | — | — | 5 | 3 | 9 | 300 |
| 4 | 3 | 2 | 5 | 6 | 2 | 6 | — | 2 | 4 | 20 | 400 |
| 5 | 3 | 4 | 4 | 7 | 2 | 3 | 2 | 8 | 5 | 25 | 500 |
| 6 | 4 | 2 | 8 | 1 | 1 | — | — | — | 6 | 30 | 600 |
| 7 | 1 | 4 | 1 | 5 | 0 | — | — | — | 7 | 9 | 700 |
| 8 | 4 | 1 | 6 | 2 | 0 | — | — | 1 | 8 | 3 | 800 |

FIG. 9(c)

| INTERSECTION NO. | INTERSECTION NAME | SMALLEST NO. OF ROAD HAVING THIS INTERSECTION AS STARTING POINT | SMALLEST NO. OF ROAD HAVING THIS INTERSECTION AS END POINT | TRAFFIC SIGNAL? |
|---|---|---|---|---|
| 1 | KANDA | 1 | 2 | YES |
| 2 | YUSHIMA | 2 | 1 | YES |
| 3 | — | 4 | 3 | NO |
| 4 | — | 6 | 5 | |

FIG.11(a)

| DESTINATION INPUT | SELECT DESTINATION |

YOUR DESTINATION IS _____, IF INCORRECT, PRESS HELP BUTTON AT LEFT AND CHANGE DEPARTURE POINT.

- SIGHTSEEING
- LODGINGS
- DINING
- SOUVENIRS
- CODE NO. INPUT
- RETURN

▨ RED COLOR

FIG.11(b)

SELECTED GENRE

| SIGHTSEEING | SELECT WHERE YOU WISH TO GO ? |

- ARASHIYAMA
- IMPERIAL PALACE
- KINKAKU TEMPLE
- BOTANICAL GARDEN
- GION
- NANZEN TEMPLE
- GINKAKU TEMPLE
- CODE NO. INPUT
- PREVIOUS PAGE
- NEXT PAGE

FIG.11(c)

| SIGHTSEEING | OK ? |

- ARASHIYAMA
- IMPERIAL PALACE
- KINKAKU TEMPLE
- BOTANICAL GARDEN
- GION
- NANZEN TEMPLE
- GINKAKU TEMPLE
- CODE NO. INPUT
- OK
- CANCEL

FIG.11(d)

DESTINATION CODE NO. INPUT

| 1 | 2 | 3 |
| 4 | 5 | 6 |
| 7 | 8 | 9 |
| PREVIOUS PAGE | OK | 0 | CANCEL |

DESTINATION IS _____

| 1 | 2 | 3 |
| 4 | 5 | 6 |
| 7 | 8 | 9 |
| PREVIOUS PAGE | OK | 0 | CANCEL |

INTERSECTION CODE NO. CANNOT BE ENTERED

| 1 | 2 | 3 |
| 4 | 5 | 6 |
| 7 | 8 | 9 |
| PREVIOUS PAGE | OK | 0 | CANCEL |

FIG.11(g)

DO YOU WISH TO RETURN ?

YES    NO

FIG.13(a)

```
DEPARTURE INTERSECTION
CODE NO. INPUT

CONTINUE TRAVELLING STRAIGHT
AHEAD UNTIL INTERSECTION
HAVING A NAME IS PASSED, THEN
STOP VEHICLE IMMEDIATELY AND
ENTER THE CODE NO. OF THE INTER-
SECTION (REFER TO INSTRUCTION
MANUAL).

PREVIOUS          CODE NO. INPUT
PAGE
```

FIG.13(b)

```
INTERSECTION CODE NO.
INPUT 1  2  3
                          4  5  6
                          7  8  9
PREVIOUS
PAGE                      OK 0  CANCEL
```

FIG.13(c)

```
                              1  3  0  2
NAME OF THE INTERSECTION IS
_____.
                          1  2  3
                          4  5  6
                          7  8  9
PREVIOUS
PAGE                      OK 0  CANCEL
```

VEHICULAR NAVIGATION APPARATUS WITH HELP FUNCTION

BACKGROUND OF THE INVENTION

This invention relates to a vehicular navigation apparatus which provides guidance along a path by outputting guidance information for travel to a desired destination.

A navigation apparatus for automotive vehicles is adapted to provide course guidance for travel to a desired destination to a driver who is unfamiliar with the local geography. Recent years have seen extensive development of such navigation apparatus.

Conventionally, a vehicular navigation apparatus relies upon so-called "route matching" in which a course is set from a starting point to a desired destination before the vehicle begins travelling, with course guidance being provided to the driver in accordance with the course set. In some of these apparatus, a map is displayed on the screen of a CRT and the course is superimposed on the map if the driver designates a specific course. In a case where the navigation apparatus designates an intersection at which a turn is to be made next in accordance with the preset course, the distance to this intersection is displayed numerically or in the form of a graph. When a turn is to be made at an intersection using such a navigation apparatus, the driver observes the course displayed on the map to decide the next intersection at which the turn is to be made, or the driver looks at the numeric or graph display to ascertain the distance to the intersection where the turn is to be made, thereby determining the proper intersection.

However, as mentioned above, the conventional navigation apparatus is such that a course is set from a starting point to a desired destination before the vehicle begins travelling and course guidance is provided to the driver in accordance with the course set. Consequently, if the driver should happen to mistake an intersection and depart from the set course, travel in accordance with the guidance provided by the navigation apparats will not be able to continue unless the vehicle is returned to the set course. In addition, a decision as to whether or not a predetermined intersection has been passed as specified by the course guidance is based upon detection of travelled distance or a left or right turn as detected by a distance sensor or steering angle sensor, respectively. In actuality, however, detection of travelled distance and steering angle is susceptible to considerable error, which can cause the navigation apparatus to make errors in judgment.

Accordingly, an apparatus for guiding a driver to a route leading to a desired destination even when the driver has strayed off a set course has been proposed in Japanese Patent Application Laid-Open (KOKAI) No. 61-21610.

This proposed navigation apparatus comprises means for detecting that a vehicle has strayed from a course of planned travel, means for detecting an intersection on a course of planned travel that is for the purpose of returning the vehicle from its present position, means for detecting the direction to the return intersection with respect to the forward direction of the vehicle, and means for displaying guidance information necessary for guiding the vehicle along the course of planned travel as well as information indicating the direction to the return intersection with respect to the forward direction of the vehicle.

With the apparatus disclosed in the abovementioned application, however, a course is set at the moment a departure (starting) point and desired destination are entered, and guidance is provided on the assumption that the vehicle will travel along this course. Consequently, if the vehicle strays from the course, it becomes necessary to return the vehicle to the course and the present position of the vehicle must be reset. As a result, difficulties are encountered in dealing with occasions where the vehicle departs from a course and in coping with the will of the driver.

The applicant has filed a patent application (U.S. Ser. No. 07/260,213, filed Oct. 20, 1988) proposing a novel navigation apparatus which relies upon an explorer system instead of the above-described route matching system. In accordance with this system, the coordinates of a plurality of geographical points (e.g., intersections, characterizing structures, etc.) are set and a desired destination is entered, whereupon a course is sought from each geographical point to the desired destination and outputted as guidance information. Navigation is possible even if distance, steering angle and geomagnetic sensors should happen to fail or even if these sensors are not provided. As a result, if the driver strays from a course or changes the desired destination, the apparatus readily provides the driver with guidance to the destination. However, a system through which desired destination, present position and the like can be inputted in simple fashion is required for this navigation apparatus.

SUMMARY OF THE INVENTION

Accordingly, an object of the present invention is to provide a vehicular navigation apparatus which, by being equipped with a help function, clarifies what operation should be performed by a driver in the event of a difficulty even if the driver is unfamiliar with the apparatus, thereby making it possible for the driver to operate the apparatus as the driver wishes.

Another object of the present invention is to provide an input system, which is particularly effective when applied to a navigation system in which when the coordinates of a plurality of geographical points (e.g., intersections, characterizing structures, etc.) are set and a desired destination is inputted, a course for travel to the destination is sought at each geographical point and outputted as guidance information.

According to the present invention, the foregoing objects are attained by providing a vehicular navigation apparatus, which is equipped with a help function, for outputting guidance information for travel to a desired destination, comprising an input unit having desired destination input means, present position input means and help function input means, a memory unit for storing desired destination information, and a display unit for outputting the guidance information in response to input information from the input unit, wherein the memory unit is provided with a non-volatile RAM, with necessary information being saved in an area of the non-volatile RAM when a help function is called by the help function input means.

According to the invention, help function items are provided for the following occasions, which serve as examples only: when the driver wishes to input or change a departure point and then depart from that point; when the driver wishes to change a desired destination while en route to a formerly set destination; when the driver strays off course while en route to a desired destination and cannot determine his present position without returning to the point at which the vehicle went off course; when a course cannot be travelled because of road construction or the like; when traffic becomes heavy and the driver wishes to change from one route to another to avoid congestion, and when the driver wishes to temporarily leave the course and then return to the course at the same point.

Thus, by providing the help function in accordance with the invention, what operation should be performed by a driver in the event of a difficulty becomes clear even if the driver is unfamiliar with the apparatus. Operations that are to be performed by the driver at times other than when ordinary travel is effect are grouped together as help functions which can be called at all times. As a result, the apparatus can be operated at the driver's volition, there is a greater degree of freedom and operation is made easier to understand. In addition, providing a large number of help function items makes it possible for the driver to cope with difficulties encountered in a large number of situations.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5(a) through 9(c) are views useful in describing the structure of data according to the invention;

FIGS. 11(a) through 11(g) illustrate an example of screens displayed in accordance with the method of FIG. 10;

FIGS. 13(a) through 13(e) illustrate examples of screens displayed in accordance with the method of FIG. 12; and FIGS. 14 through 23 are views useful in describing an embodiment of a vehicular navigation apparatus equipped with a help function in accordance with the present invention, in which:

FIG. 14 is a flowchart of processing during ordinary operation;

FIG. 15 is a flowchart of processing when help is provided;

FIG. 17 is a flowchart of processing for inputting a departure point;

FIG. 19 is a flowchart of processing for changing destination;

FIG. 20 is a flowchart of processing executed when a driver loses his way;

FIG. 21 is a flowchart of processing executed when a road is closed to traffic;

FIG. 22 is a flowchart of processing executed when avoiding traffic congestion; and FIG. 23 is a view showing an example of a screen displayed in order to avoid traffic congestion.

DESCRIPTION OF THE PREFERRED EMBODIMENT

An embodiment of the invention will now be described in detail with reference to the drawings.

Figure 1:
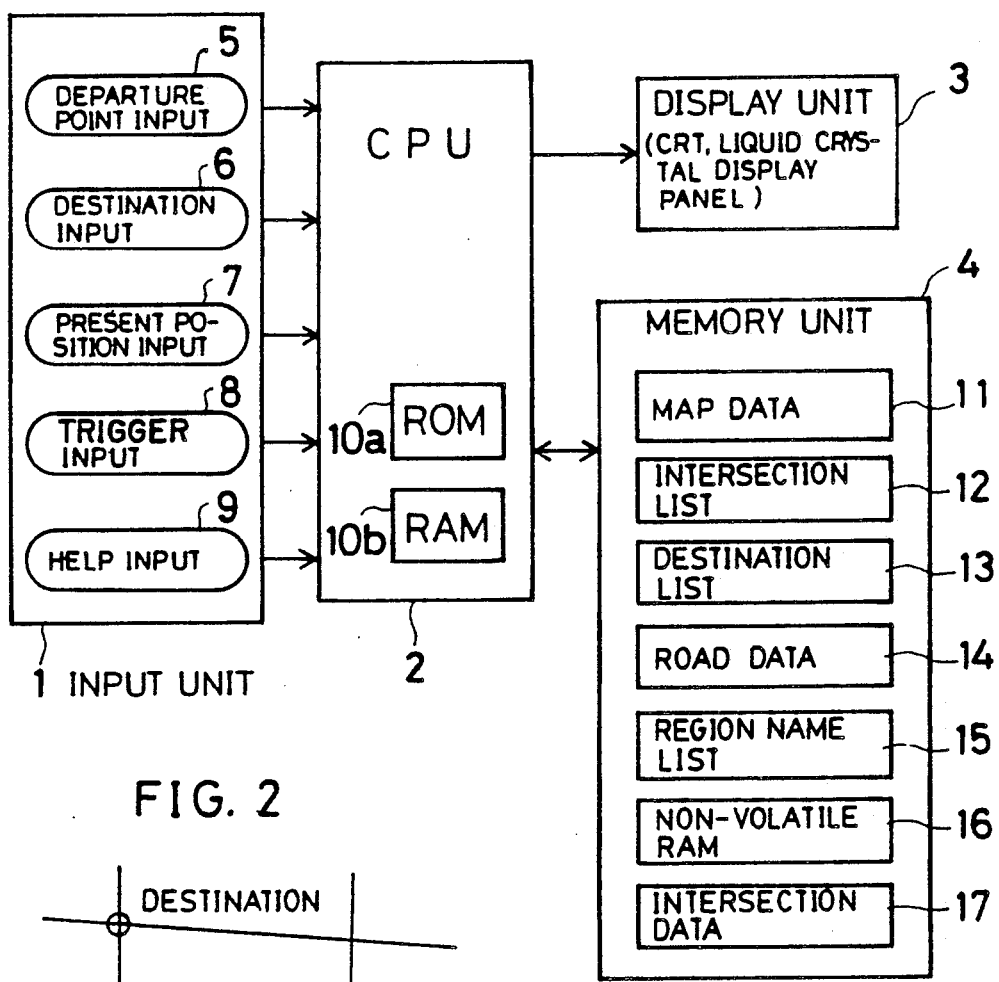
FIG. 1 is a block diagram illustrating the construction of an embodiment of a navigation apparatus according to the present invention.

As shown in FIG. 1, a navigation apparatus according to the invention comprises an input unit 1, a CPU 2, a display unit 3 such as a CRT or liquid crystal display panel, and a memory unit 4. The input unit 1 has departure point input means 5, desired destination input means 6, present position input means 7, trigger input means 8 and help input means 9. These means may be a keyboard, a touch panel, a light pen, a mouse or a voice input means.

The memory unit 4 is a memory such as a CD-ROM in which network data indicative of geographical points, namely desired destination and present position, and other information are stored in advance. As will be described below, map data 11, a list 12 of intersections, a list 13 of desired destinations, road data 14 and a list 15 of regions are stored. The memory unit 4 includes a non-volatile RAM 16 having an area for storing information saved when help is called. The purpose of the RAM 16 is to allow processing to start in accordance with the help function in a case where the vehicle ignition is turned off in the help mode and then turned on. To this end, the non-volatile RAM 16 has areas for storing flag information indicating the ordinary operating state and help processing, route information expressed by a series of intersections and a series of nodes, information indicative of present position, and data indicative of departure point, initial departure point and desired destination.

When a desired destination is designated by an input from the input means 1, the CPU 2 sets information for travel to the desired destination, by a method such as course exploration, in accordance with each geographical point stored in the memory unit 4. To accomplish this, the CPU 2 executes a program stored in a ROM 10a and stores the information in a RAM 10b.

Figure 2:
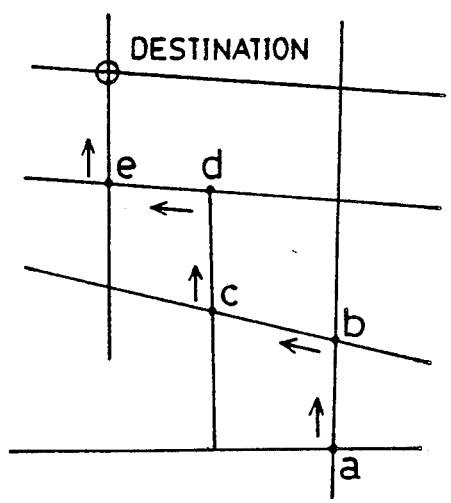
FIG. 2 is a diagram illustrating one example of a route sequence.

When present position information is entered by the input means 1, the display unit 3 outputs guidance information for this point. If only intersections serve as geographical points, the outputted guidance information is that for travel to the next intersection, such as an indication of a left or write turn, at the intersection serving as the guidance point. In a case where there is a second intersection encountered immediately after turning at the aforementioned next intersection, it is of course possible for the outputted guidance information to include the direction of the first turn along with information designating the proper lane to take after the turn, as well as the direction of the second turn and the associated guidance information. For example, the display unit can output guidance information relating to a course leading to a desired destination in accordance with the path sequence a, b, c, ... shown in FIG. 2.

Figure 3:
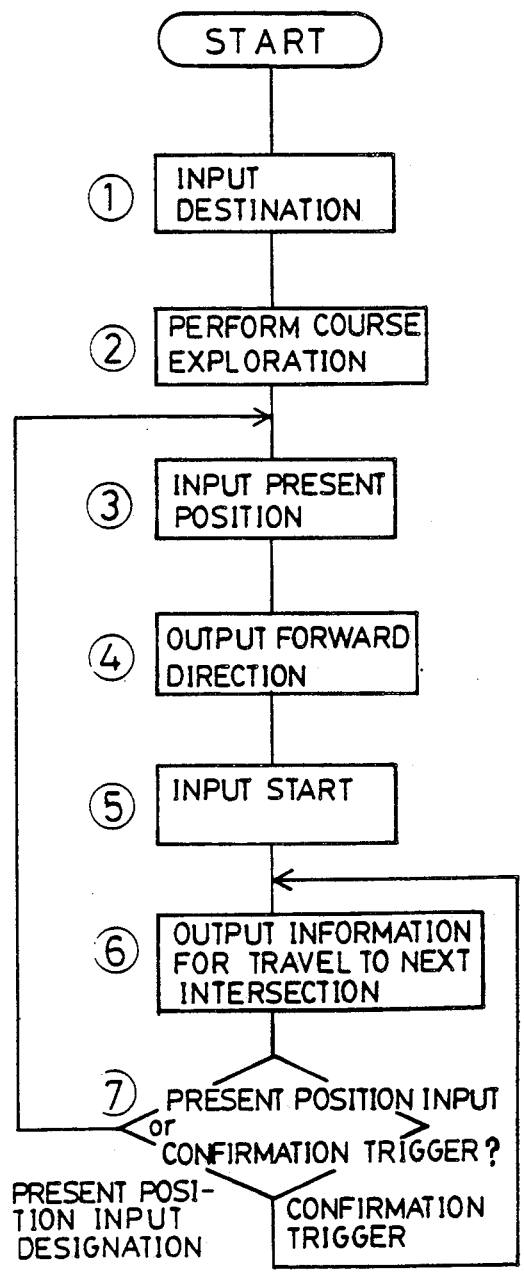
FIG. 3 is a flowchart of navigation processing according to the invention.

Processing associated with the navigation apparatus of the invention will now be described with reference to the flowchart of FIG. 3.

When the driven enters the code of a desired destination at a step (1) of the flowchart, a course exploration mode is established in which information for travel to the desired destination is set for all geographical points with the exception of the entered desired destination (step 2). When course exploration ends, a present position input mode is established, in which the driver inputs the code of his present position (step 3). When this is done, the proper direction of forward travel from this position is outputted (step 4). Next, when the driver inputs an intersection verification trigger (i.e., when a start input is made) at step (5), information for travel to a destination which is the next intersection is outputted (step 6). This is followed by step (7), at which monitoring is performed to see whether the intersection verification trigger or a signal from a present position input button has been entered. If the intersection verification trigger has been entered, the program returns to the processing of step (3). In other words, in accordance with this system, a trigger is inputted each time an intersection is verified providing that the vehicle is travelling as per instructions. If the vehicle strays from the instructed course and the driver notices this only after the vehicle has travelled to another intersection, the present position input button is pressed. Accordingly, whenever a trigger is inputted, guidance information relating to an intersection on a route leading to the desired destination is outputted in sequential fashion. When the present position input button is pressed, the present position input mode is established.

Figure 4A:
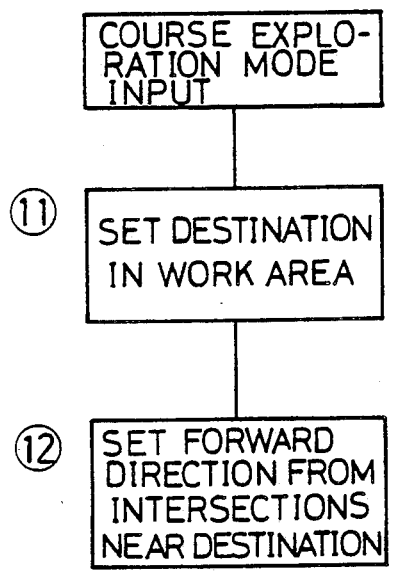
FIGS. 4(a) and 4(b) are useful in describing course exploration processing.
Figure 4B:
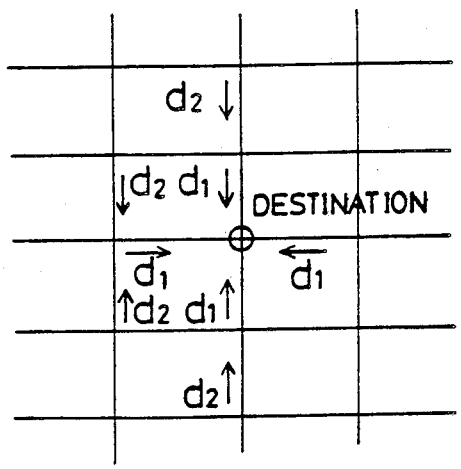

The course exploration processing of step (2) will now be described with reference to FIGS. 4(a) and (b). When the cause exploration input mode is established, as shown in FIG. 4(a), first the desired destination is set in a work area at step (11), after which forward directions from intersections near the destination are set at step (12). As shown in FIG. 4(b), the set forward directions include forward directions $d_1$ at intersections before the destination, and forward directions $d_2$ at intersections before the first-mentioned intersections. It is permissible to execute this course exploration after the processing of step (3) in FIG. 3, in which case course exploration would be performed whenever present position is inputted. Furthermore, since guidance information is outputted in response to the trigger input in accordance with the route set as a result of course exploration, the pertinent intersections are limited in number. Accordingly, it will suffice to provide guidance information solely for these intersections, thereby minimizing the information required.

A method of inputting the desired destination or present position will now be described.

FIGS. 5 through 9 illustrate the structure of data in accordance with the invention.

Figure 5A:
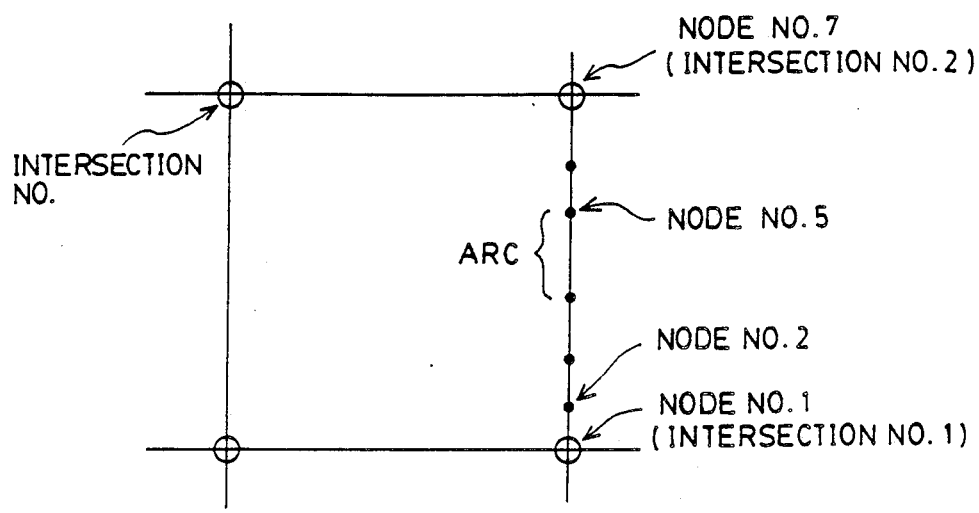
Figure 5B:
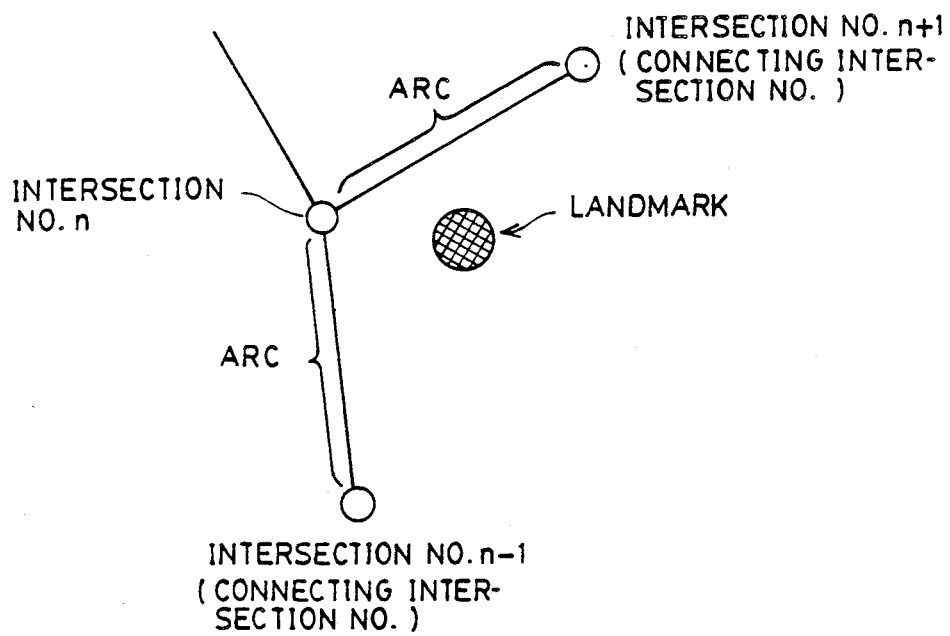

FIG. 5 is a diagram useful in describing the fundamental approach adopted in forming map data. As shown in FIG. 5(a), a map is not construed merely an intersections but also includes nodes, which are points having useful guidance information (e.g., bridges, rivers, buildings, gasoline stations, etc.) at geographical points between intersections. Thus, nodes indicate point data representing map coordinates, and some of the nodes are intersections. Arcs indicate line data and represent portions of the roads. By adopting such an arrangement, a landmark serving as useful guidance information can be provided as data between roads (i.e., between two intersections) connecting intersection numbers on either side of an intersection number n depicted in FIG. 5(b).

FIG. 6 illustrates node series data. What is stored are east longitude and north latitude, namely the coordinates of the pertinent geographical point, for each node number, as well as the attribute which distinguishes the effective guidance information (e.g., bridges, rivers, buildings, gasoline stations) as data for each node number.

FIG. 7 illustrates an example of an intersection list, in which there are stored the code numbers of the intersections, the intersection names, the intersection numbers (numbers assigned only to those of the nodes that are intersections), the node numbers of two connecting nodes, as described above with reference to FIG. 5(b), the names of landmarks and attributes.

FIG. 8 illustrates an example of a desired destination list, in which there are stored code numbers, the names of desired destinations, parking lot numbers, the numbers of two connecting intersections connecting a desired destination, the directions of parking lots (whether a parking lot is on the left or right side of a road or straight ahead), the numbers of photographs of connecting intersections, the numbers of photographs of parking lot exits, block data for each region, and coordinates (east longitude, west latitude). The arrangement is such that the attribute of each desired destination is distinguishable by genre. For example, the following numbers can be assigned to the most significant bit of code number to indicate genre: 0 (sightseeing), 1 (public facility), 2 (lodgings), 3 (dining), 4 (place of business), 5 (gasoline station), 6 (intersection), 7 (parking lot), 8 (souvenirs), and other attribute data can be provided if desired. These desired destination data indicate parking areas near the desired destinations. If a desired destination is a parking lot, the driver is informed of the connecting intersection numbers, the direction of the parking lot (whether it is on the left or right side of a road or straight ahead), the photograph numbers of the connecting intersections and the photograph numbers of the parking lot exit. Thus, the driver is guided in positive fashion until the vehicle arrives at its final destination.

Figures 9A, 9B:
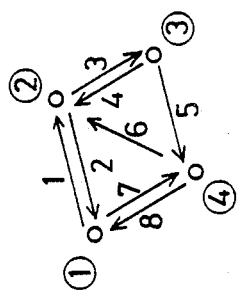

FIG. 9(a) illustrates an example of road data. As shown in FIG. 9(b), each road is assigned a road number(s) along with the direction(s) of traffic flow. The stored road data include, for each road number, the numbers of intersections which are starting and end points, the number of a road having the same starting point, the number of a road having the same end point, road width, information relating to prohibitions, information relating to guidance not required (as when the driver need only continue travelling straight ahead), photograph numbers, the numbers of nodes, the leading addresses of node series data, length, etc.

Destination input will now be described with reference to FIGS. 10 and 11.

Figure 10:
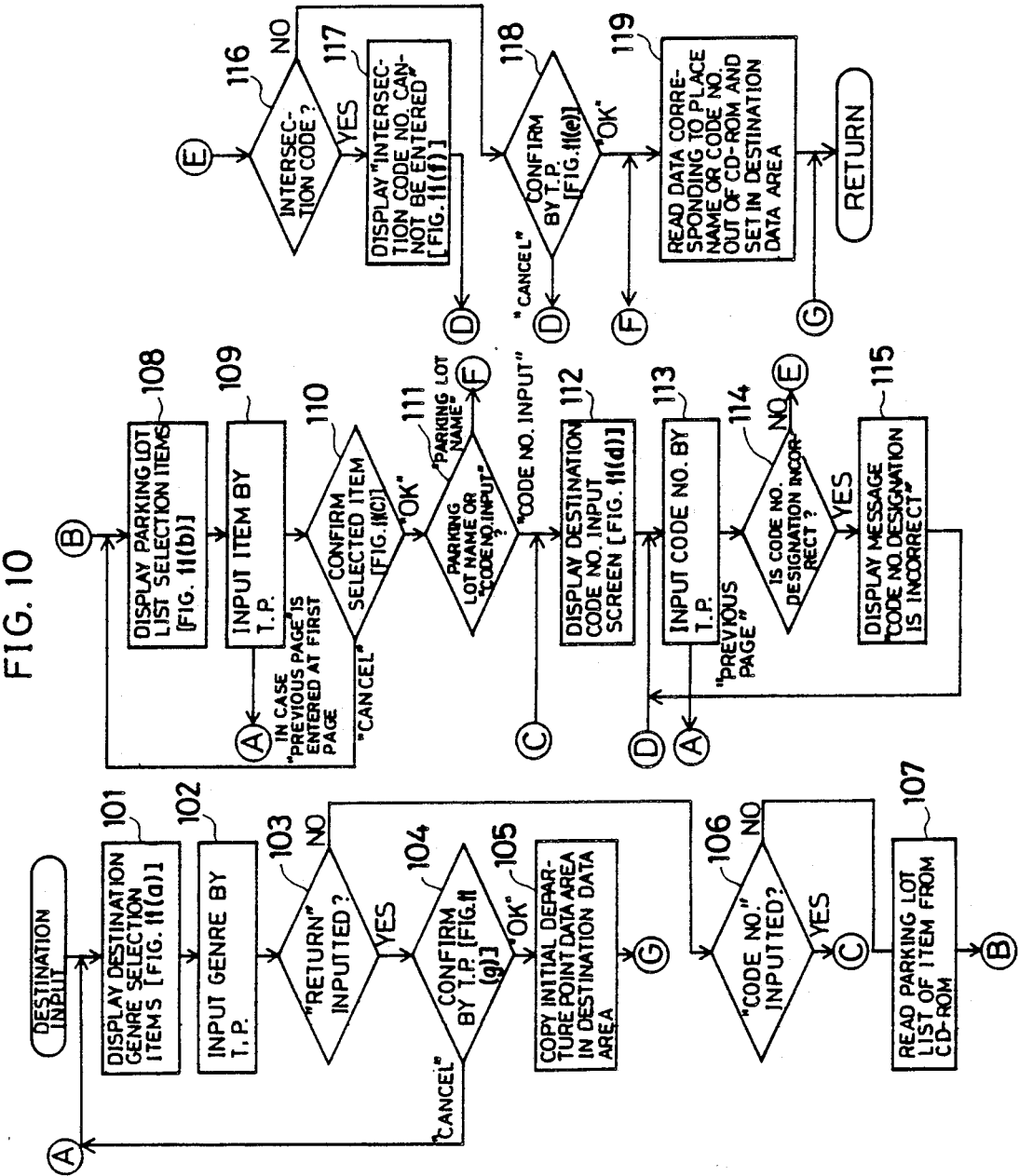
FIG. 10 is a flowchart illustrating an example of a desired destination input method.

FIG. 10 is a flowchart of the associated processing. A step 101 calls for the screen shown in FIG. 11(a) to be displayed as a desired destination input. This screen if for indicating the genre of the destination. Items which appear frequently, such as "SIGHTSEEING", "LODGINGS", "DINING", SOUVENIRS", "CODE NO. INPUT", "RETURN" are displayed in red as selectable items, and a desired genre is selected by touch-panel input at step 102. Next, it is determined at step 103 whether "RETURN" on the screen of FIG. 11(a) has been inputted. If the answer is NO, it is determined at step 106 whether "CODE NO." has been inputted. If the answer received here is YES, then the program proceeds to step 112.

If a NO answer is received at step 106, the program proceeds to step 107, at which a list of parking lots (destinations) for the selected item are read in from the CD-ROM, whereupon the screen shown in FIG. 11(b) is displayed at step 108. At the same time, a voice track "SELECT YOUR DESIRED DESTINATION" is played. Here also items are displayed in the order of their popularity. By touching a "PREVIOUS PAGE" or "NEXT PAGE" key, parking lots can be brought to the screen and a desired parking lot can be selected. All of the input display sections are displayed in the color red. The last item in the display is the "CODE INPUT NO. INPUT" item. If "PREVIOUS PAGE" is entered at the first page, the program returns to step 101.

When a desired parking lot is inputted by the touch panel (step 109), a confirmation screen shown in FIG. 11(c) is displayed at step 110. Here the selected item is backlighted in, say, the color blue, while the other items appear in dark blue, so that the driver may easily confirm the selection made. If "CANCEL" is pressed, the program returns to step 108. If OK is pressed, it is determined at step 111 whether the name of a parking lot has been inputted or a code number. If the name of a parking lot is the desired destination, the program proceeds to step 119, where data corresponding to the name of the parking lot are read from the CD-ROM and set in the memory area of the CPU.

When a change is made in the code number input at step 111, or when code number input is selected at step 106, a code number input screen shown in FIG. 11(d) is displayed at step 112, after which a desired parking lot code number is inputted from the touch panel at step 113. It is then determined at a step 114 whether the code number designation is erroneous. If it is, step 115 calls for display of a message reading "CODE NO. DESIGNATION IS INCORRECT" and the program returns to step 113. If the code number designation is correct, then it is determined at step 116 whether the code number is an intersection code. If it is not an intersection code, the program proceeds to step 118, at which the desired destination is displayed automatically, as shown in FIG. 11(e). If the "OK" key is pressed, the program proceeds to step 119, at which data corresponding to parking lot name are read out of the CD-ROM and set in the memory area of the CPU. The program returns to step 113 if "CANCEL" is pressed.

If the code number designated at step 116 is indicative of an intersection, a message reading "INTERSECTION CODE NO. CANNOT BE ENTERED", which is shown in FIG. 11(f), is displayed at step 117 and the program returns to step 113. When "RETURN" is inputted at step 101 in execution of the above routine, the screen of FIG. 11(g) is displayed through steps 103, 104. If the driver presses "OK", the initial departure point data are copied in the desired destination storage area at step 105.

Input of present position at an intersection will now be described with reference to FIGS. 12 and 13.

Figure 12:
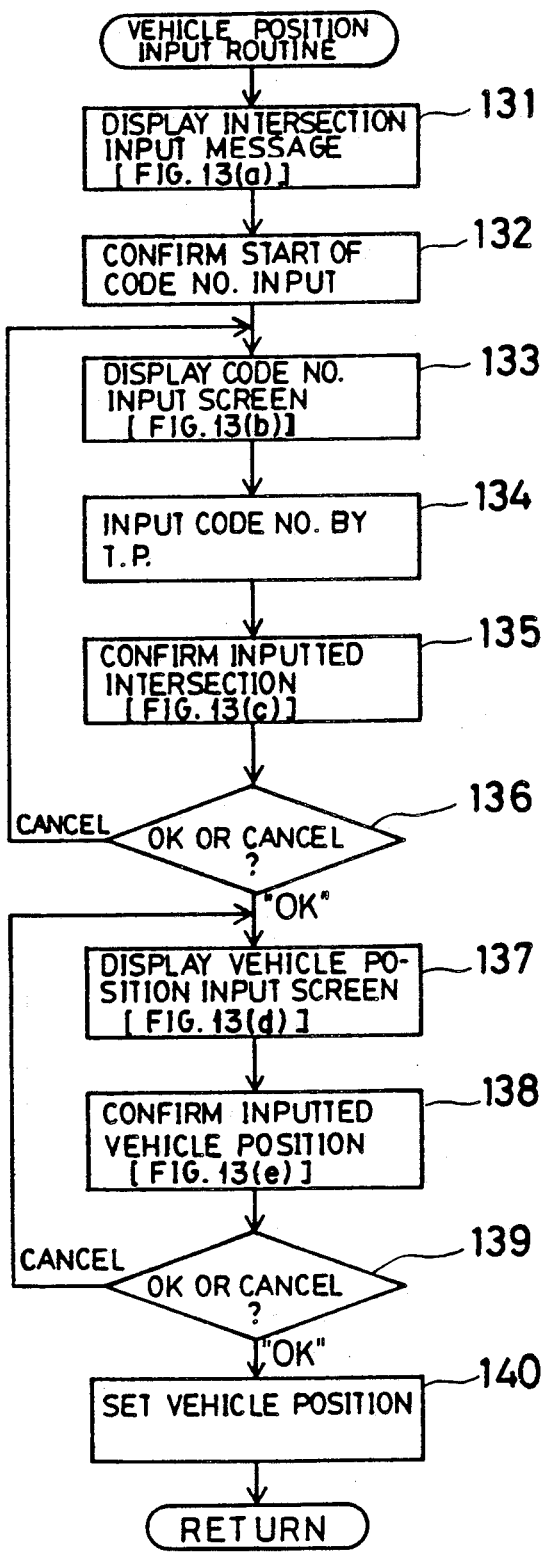
FIG. 12 is a flowchart illustrating an example of a present position input method.

FIG. 12 is a flowchart of processing for setting the position of an automotive vehicle. Step 131 of the flowchart calls for display of a message, shown in FIG. 13(a), requesting entry of the name of an intersection. In response to the message, the driver continues driving straight ahead until an intersection having a name is passed, whereupon the driver immediately stops the vehicle and enters the intersection number (step 132) while referring to an instruction manual. When this is done, a code number input screen shown in FIG. 13(b) is displayed at step 133 and the code number is inputted by the touch panel at step 134, in response to which the name of the intersection shown in FIG. 13(c) is displayed at step 135. If the entered code number is incorrect, a message to this effect will be displayed at this time.

Figure 13D:
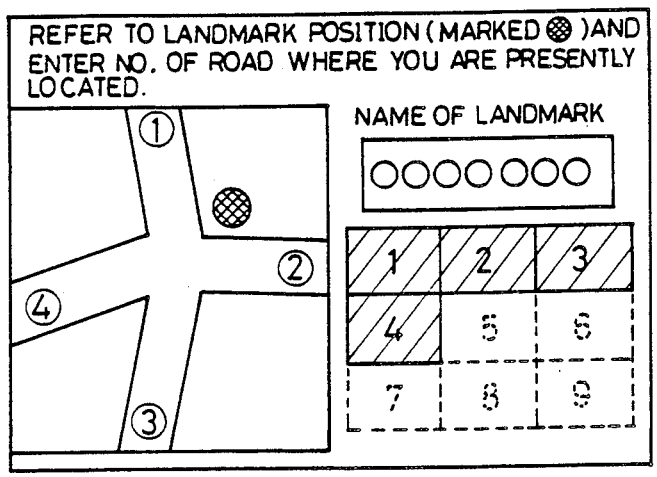

Next, it is determined at step 136 whether the name of the intersection is "OK" or is to be cancelled. If "CANCEL" is pressed, the program returns to step 133. If "OK" is pressed, processing for displaying a vehicle position input screen is executed at step 137 and the screen shown in FIG. 13(d) is displayed. Here the node data inputted by code number is read from the map data and the shape of the intersection is displayed based on the data indicative of the arcs connected to this intersection. In addition, the numbers of the roads leading to the intersection are displayed on the roads so that road number can be entered from the ten-key pad. As shown in FIG. 13(d), only those keys corresponding to the intersection road numbers are displayed in, say, the color red. Further, the location of a landmark is displayed at the position of a line segment bisecting the angle formed by two arcs, and the name of the landmark is displayed as well.

Figure 13E:
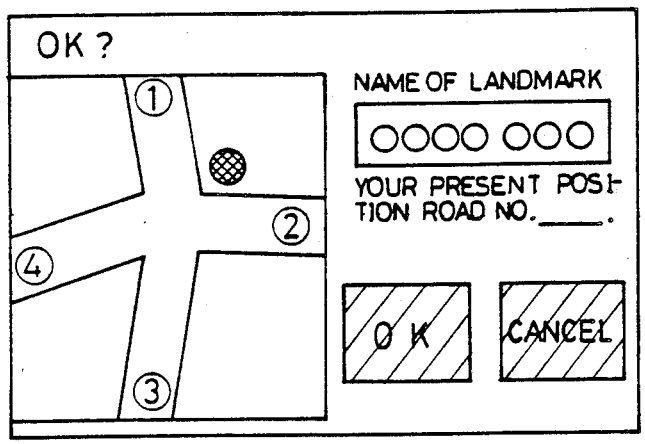

When the driver enters the number of the road on which the vehicle is presently located while referring to the location of the landmark, a screen shown in FIG. 13(e) is displayed at step 138. This screen calls for the driver to confirm the number of the road on which the vehicle is presently located. Step 139 calls for the driver to press "OK" or "CANCEL". The program returns to step 137 if "CANCEL" is pressed. If "OK" is pressed, a location that is a predetermined distance (e.g., 70 m) from the starting point node on the designated arc is set as the vehicle position at step 140. With regard to the shape of the intersection on the screen of FIG. 13(e), first an intersection number $C_o$ is specified by inputting the name of the intersection using a code number. On the basis of this intersection number $C_o$, roads leading to the intersection designated as a starting point, namely roads which include the designated intersection, are selected from the arc and road data (FIG. 9). Then, from the leading address of the node series data, the node series data of FIG. 6 are transformed from map coordinates to screen coordinates and displayed.

The help function characterizing the present invention will now be described.

Figure 14:
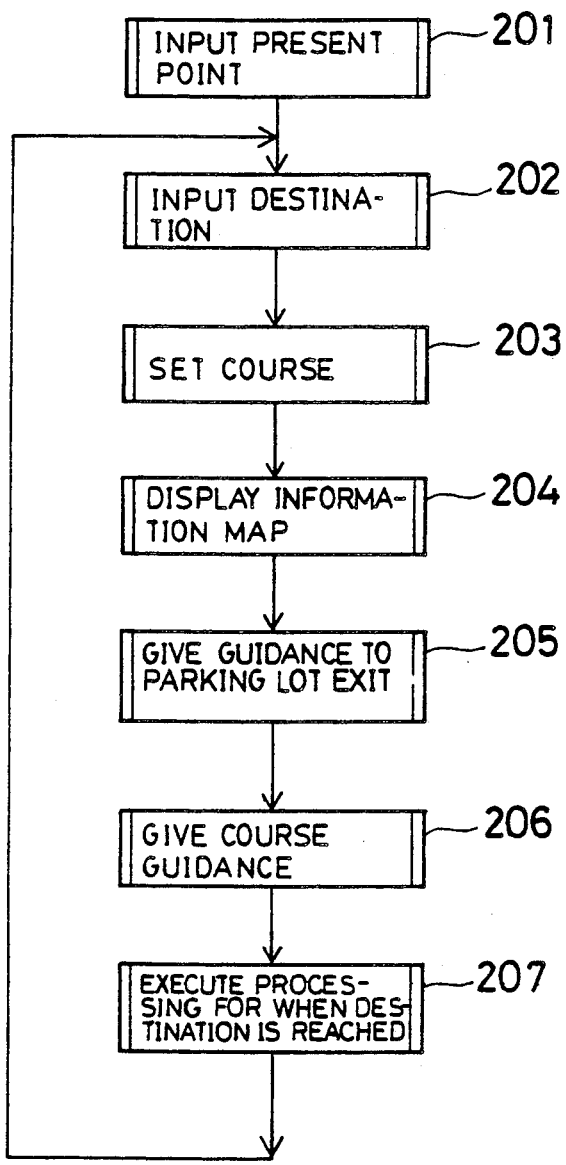

The flow of processing during ordinary operation is as shown in FIG. 14. Specifically, step 201 calls for entry of present position (departure point). This entails pressing a reset switch, whereupon the driver selects his present position from an already stored list and sets this position as an initial departure point. This state will be maintained until the reset switch is pressed again. The desired destination is inputted at a step 202 (refer to the description of FIGS. 10 and 11).

A course is set at step 203. This entails automatically searching for a course from the exit of a parking lot at the present position to the entrance of parking lot at the desired destination based on stored network data composed of intersections and arcs between intersections, and outputting the results of the search as intersection series data along a route. In addition, in order to detect present position, a course is outputted and stored as a series of nodes in accordance with map data expressed by nodes and arcs.

An information map is displayed at step 204. This involves displaying a map, at a scale which will enable both the present position and desired destination to fit on the same screen, in accordance with stored map data and course node data, and displaying the present position, the desired destination and the course between the two. Also displayed are the name of the destination, the name of the next intersection, the travelling direction to this intersection, the travelling distance remaining to reach this intersection, and the travelling distance remaining to reach the destination.

Step 205 calls for the driver to be guided to a parking lot exit. Here the forward direction of travel at the parking lot exit and a photograph of the exit are displayed and a start input for detection of present position is made manually at the exit.

Course guidance is given at step 206. This involves displaying a photograph of the scenery at the next intersection where guidance will be provided, the name of the intersection, the layout of the intersection, remaining travelling distance to the intersection, characterizing features (bridges, buildings, etc.) included in the photograph of scenery, and the direction of forward movement from this intersection. Maps and screens are changed over to give continuous guidance. Whenever passage through an intersection is detected by present position detecting means, guidance to an intersection on the course is given in successive fashion. This processing is repeated until the desired destination is reached.

When the vehicle arrives at the desired destination, the processing of step 207 is executed. This entails setting the attained destination as the new present position, thereby making it possible for the driver to input a new destination.

The foregoing relates to course guidance during ordinary operation. According to the present invention, help is provided at other times. Specifically, the driver can select help items by pressing a help switch. For the sake of safety, however, the arrangement is such that the operator cannot manipulate the help function while the vehicle is travelling. The following are provided as examples of help function items:

(1) DEPARTURE POINT INPUT

This item is used when the driver wishes to input or change a departure point and then depart from that point.

(2) DESTINATION CHANGE

This item is used when the driver wishes to change a desired destination while en route to a formerly set destination.

(3) LOST

This item is used when the driver strays off course while en route to a desired destination and cannot determine his present position without returning to the point at which the vehicle went off course.

(4) ROAD CLOSED

This item is used when a course cannot be travelled because of road construction or the like.

(5) CONGESTION AVOIDANCE

This item is used when traffic becomes heavy and the driver wishes to change from one route to another to avoid congestion.

(6) SIDE TRIP

This item is used when the driver wishes to temporarily leave the course and then return to the course at the same point.

(7) HELP FUNCTION INSTRUCTIONS

This item is used when the driver wishes to have each of the abovementioned items explained.

Figure 15:
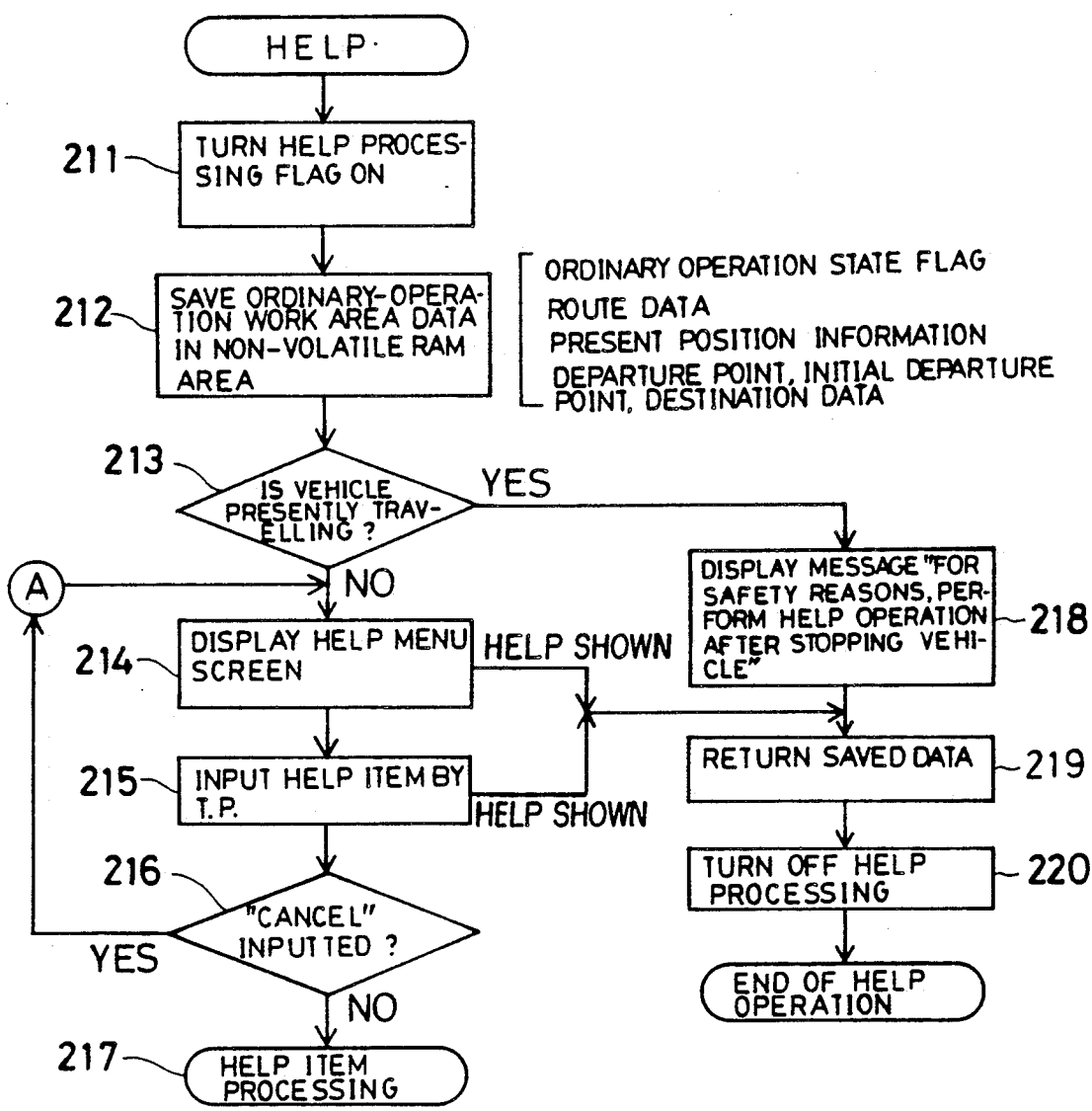
Figure 16A:
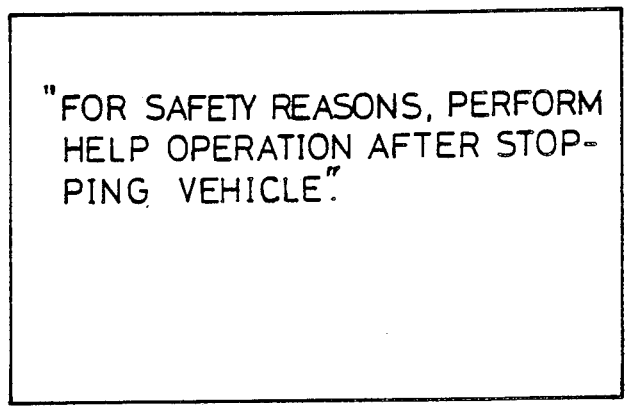
FIG. 16(a) and 16b) illustrate examples of screens displayed when such help is provided.

FIG. 15 is a flowchart of processing for the above-described help function. Step 211 of the flowchart calls for a help processing flag to be turned on. This is followed by step 212, at which work area data indicative of ordinary operation, such as a flag indicating the ordinary operating state, route data, present position information, departure point, initial departure point and desired destination data, are saved in an area of the non-volatile RAM. It is determined at step 213 whether the vehicle is presently in motion. If the vehicle is moving, the program proceeds to step 218, at which the message shown in FIG. 16(a) is displayed. This is followed by returning the saved data (step 219), turning off the abovementioned flag indicative of help processing (step 220) and terminating the help operation.

Figure 16B:
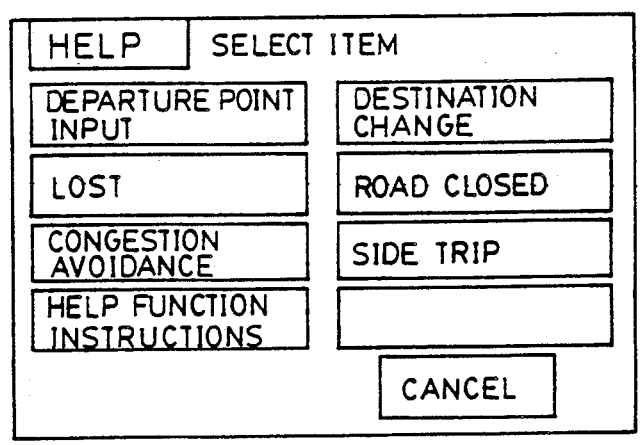

If it is determined at step 213 that the vehicle is at rest, the menu screen of help items shown in FIG. 16(b) is displayed at step 214. When a help item is inputted at step 215 by means of the touch panel, processing associated with the selected item is executed at step 217 unless "CANCEL" is pressed. If "CANCEL" is pressed, the program returns to step 214. If the help switch is pressed during the processing of each selected item, the program returns to step 214 and thence to steps 219, 220.

Figure 17:
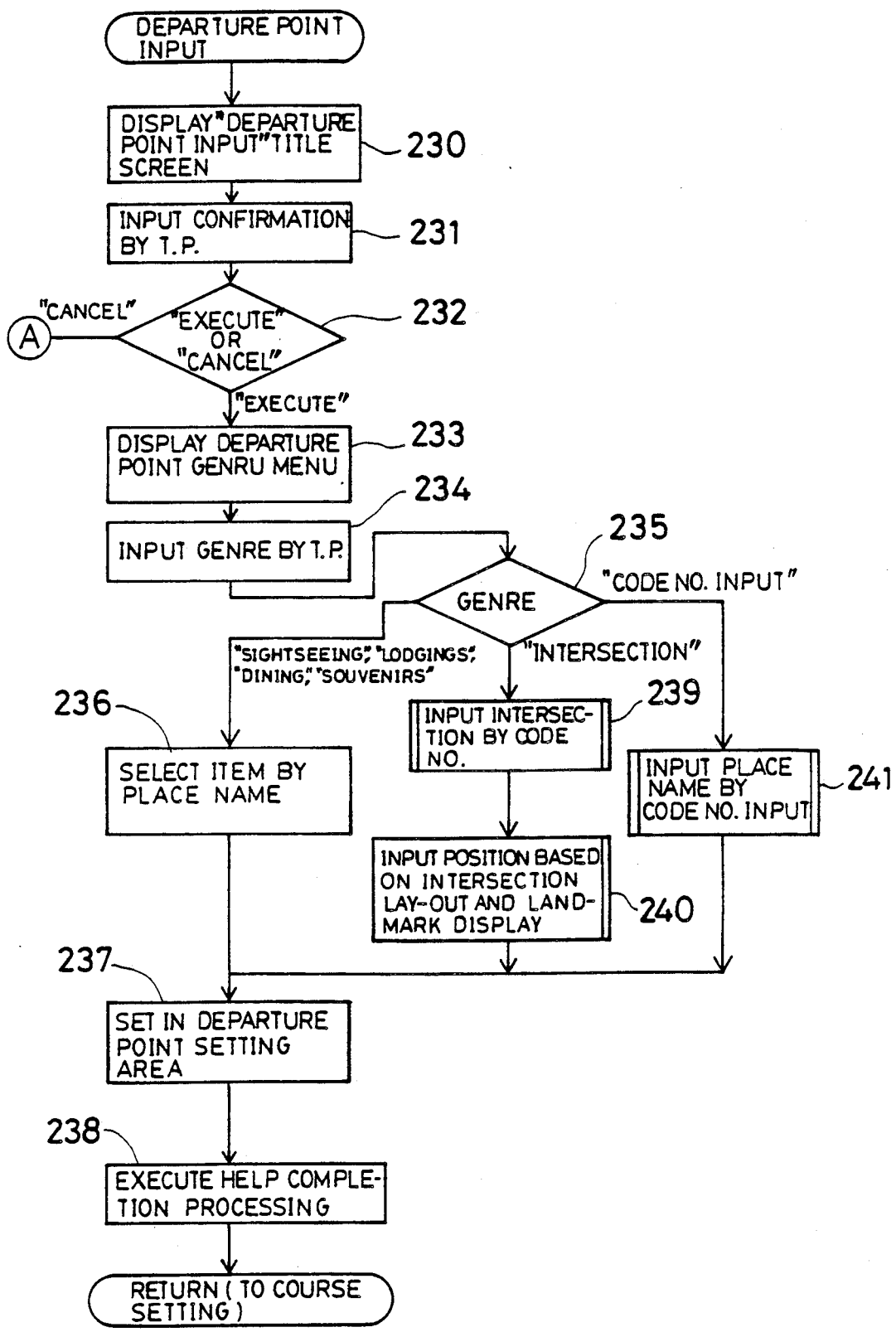
Figure 18A:
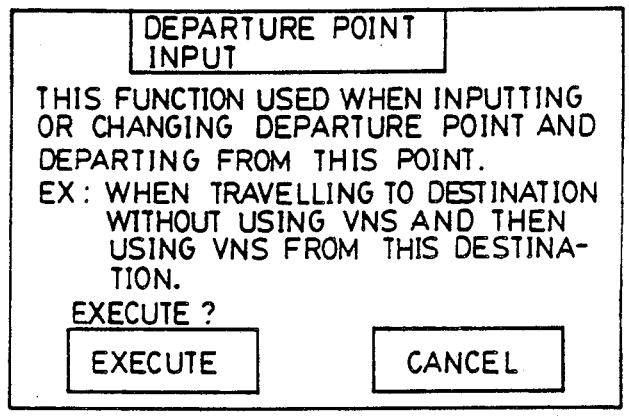
FIGS. 18(a), 18(b), and 18(d) are examples of screens displayed for inputting departure point.
Figure 18B:
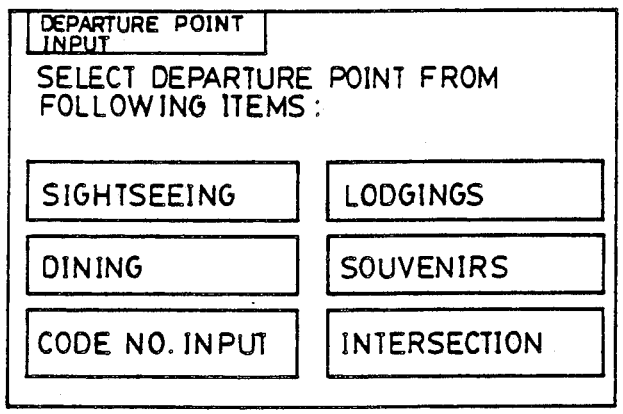
Figure 18D:
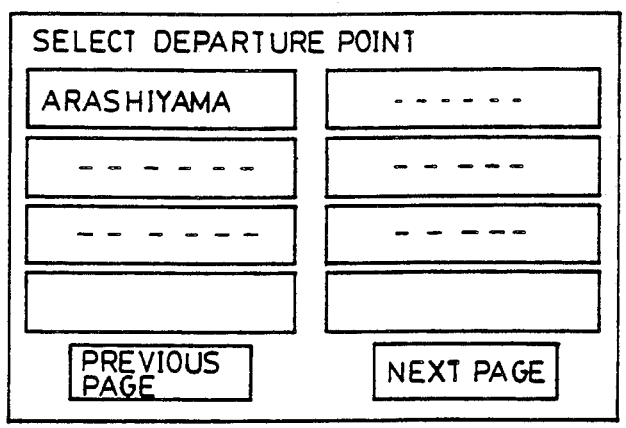

FIG. 17 is a flowchart of processing for the DEPARTURE POINT INPUT item mentioned above. At step 230 of this flowchart, a departure point input title screen shown in FIG. 18(a) is displayed. Step 231 calls for the driver to input confirmation by using the touch panel. It is determined at step 232 whether "EXECUTE" or "CANCEL" has been pressed. In case of the latter, the display returns to the help menu screen of step 214 in FIG. 15; in case of the former, a departure point genre menu shown in FIG. 18(b) is displayed at step 233. When the driver enters a genre at step 234 by using the touch panel, the type of genre inputted is investigated at step 235. Since operation in this regard is similar to that for destination input or present position input set forth in connection with FIGS. 10 through 13, an explanation is deleted. When the departure point is entered, the point is set in the departure point setting area of the non-volatile RAM at step 237 and help completion processing is executed at step 238.

Figure 19:
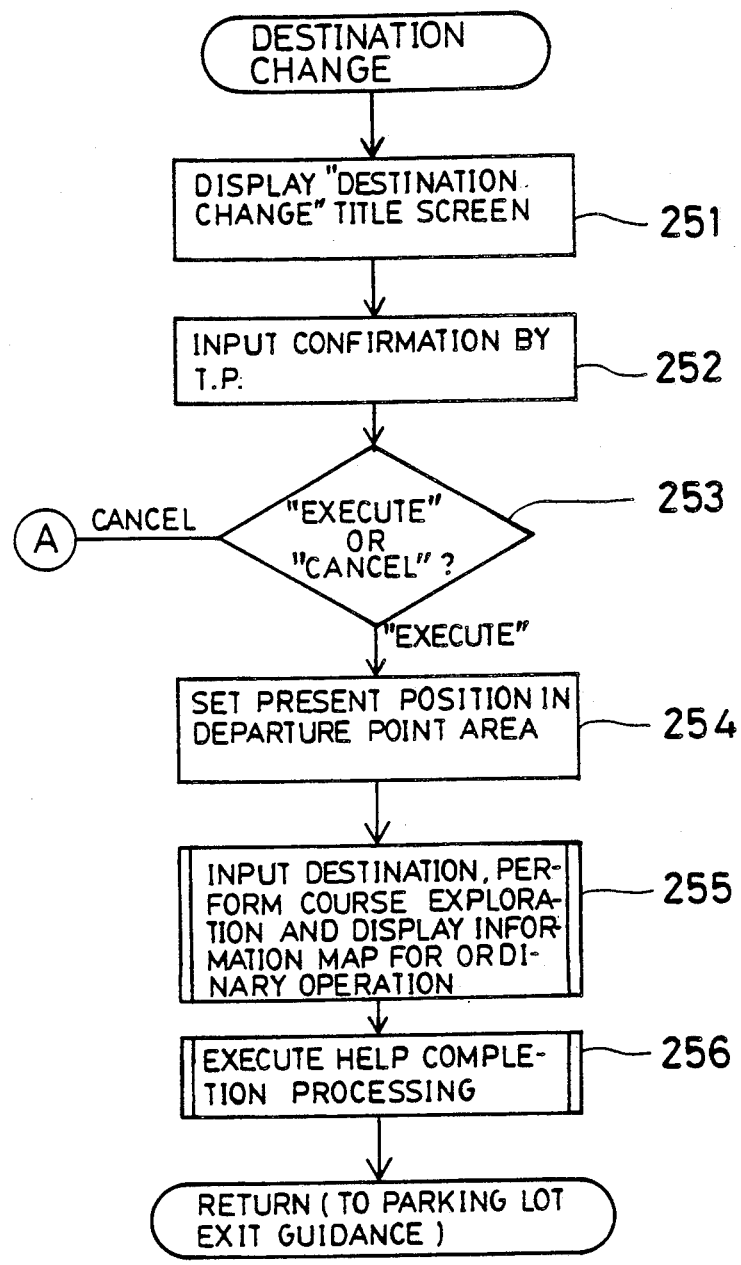

FIG. 19 is a flowchart of processing for the DESTINATION CHANGE item mentioned above. At step 251 of this flowchart, a destination change screen is displayed. Step 252 calls for the driver to input confirmation by using the touch panel. It is determined at step 253 whether "EXECUTE" or "CANCEL" has been pressed. In case of the latter, the display returns to the help menu screen of step 214 in FIG. 15; in case of the former, the present position is set in the departure point storage area at step 254, and processing for ordinary operation described in FIG. 14, namely for destination input, course exploration and information map display, is executed at step 255.

Figure 20:
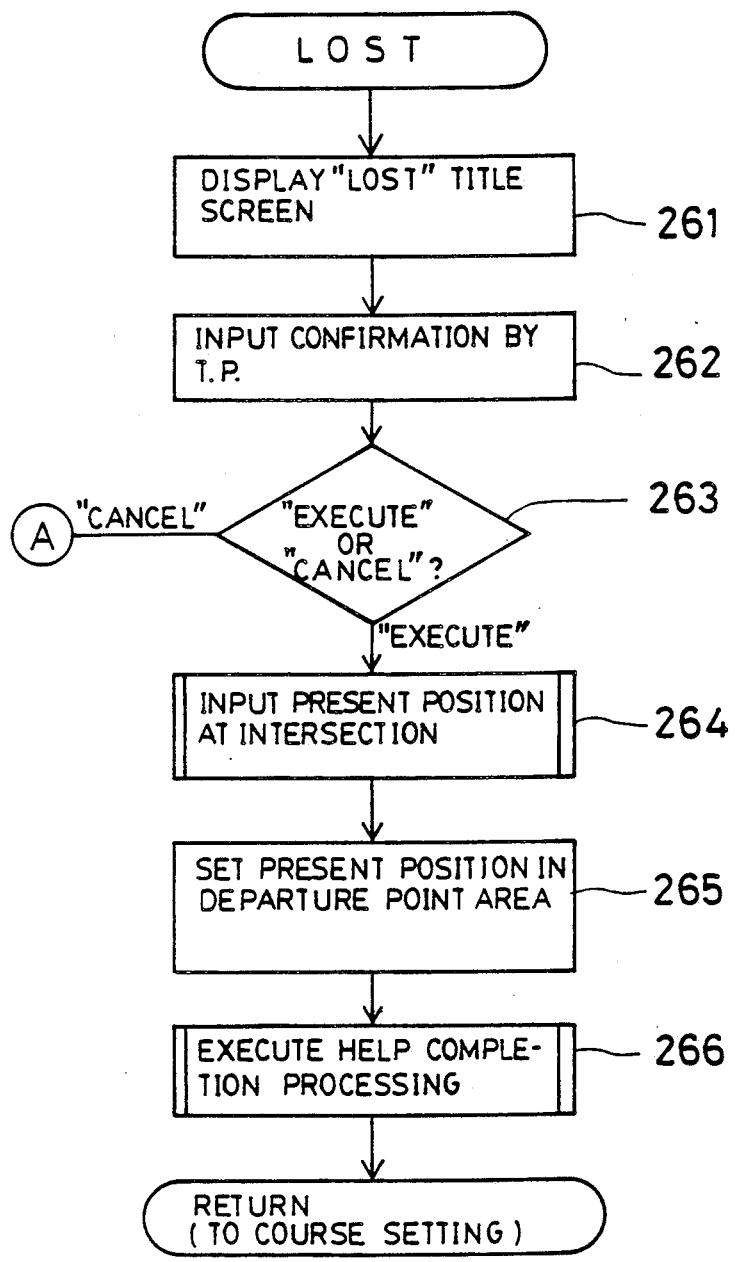

FIG. 20 is a flowchart of processing for the LOST item mentioned above. If execution is just as described above, an input of present position at an intersection is made at step 264 and the present position is set in the departure point storage area at step 265.

Figure 21:
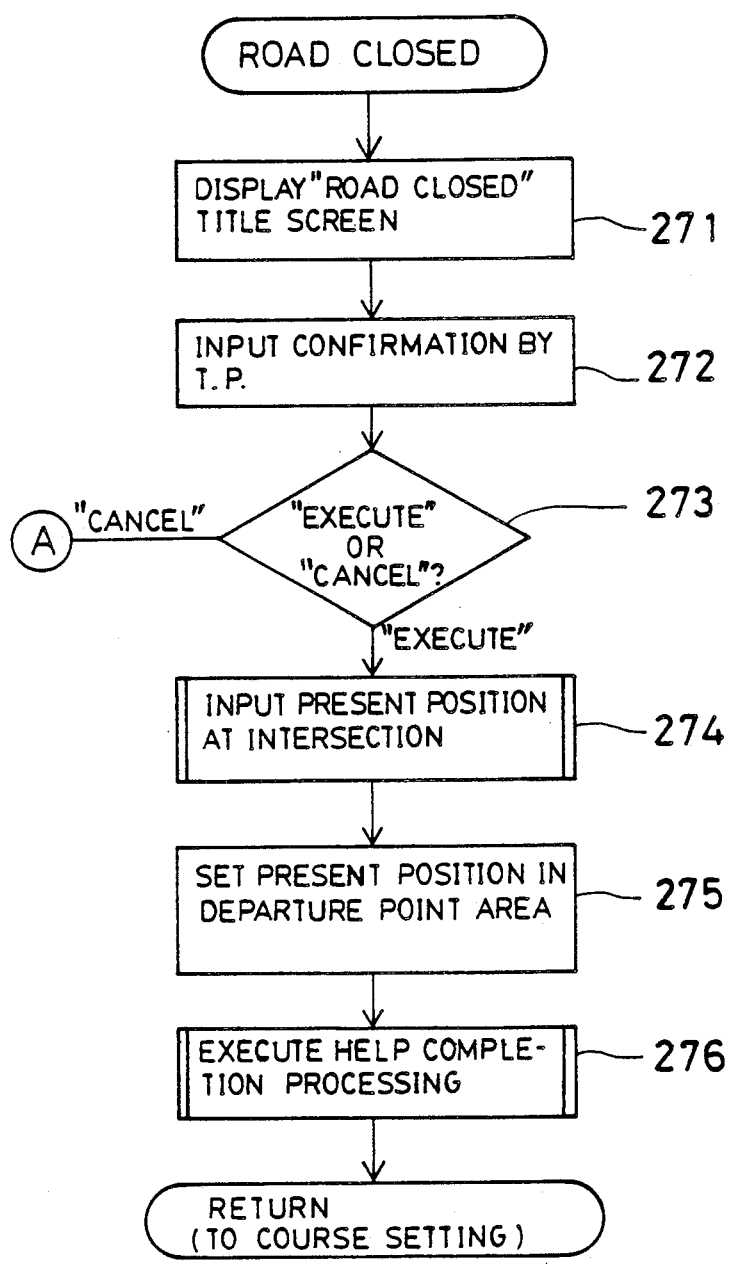

FIG. 21 is a flowchart of processing for the ROAD CLOSED item mentioned above. The method of processing is similar to that of FIG. 10.

Figure 22:
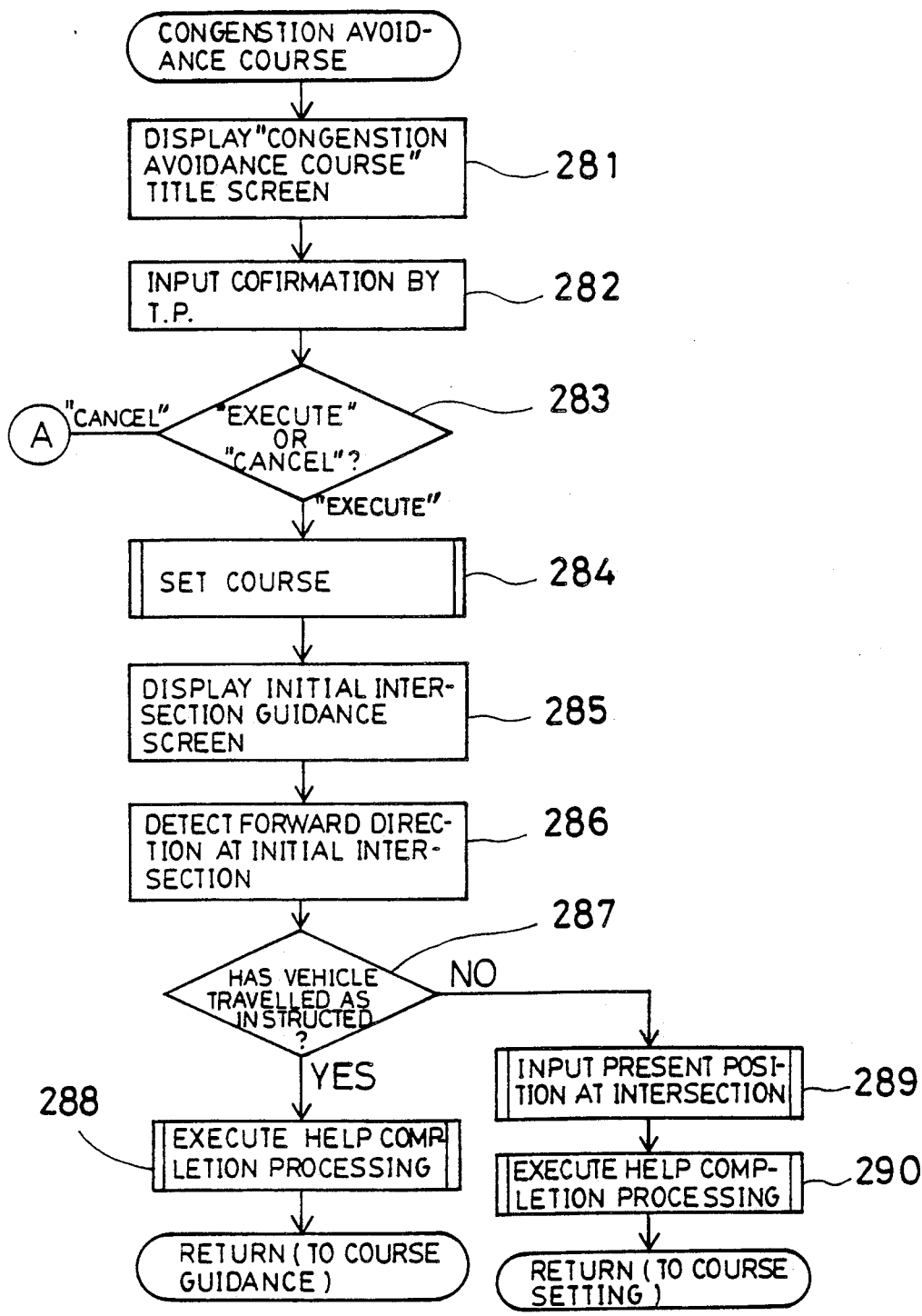
Figure 23:
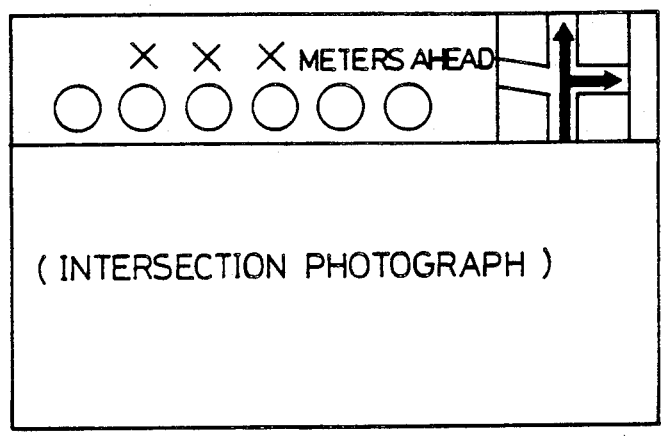

FIG. 22 is a flowchart of processing for the CONGESTION AVOIDANCE item mentioned above. When the processing of steps 218 through 283 has been executed, a course is set at step 284 and an initial intersection guidance screen shown in FIG. 23 is displayed at step 285. Next, direction of travel at the initial intersection is detected at step 286, and it is determined at step 287 whether the vehicle has proceeded as instructed. If the vehicle has so proceeded, help termination processing is executed. If the vehicle has not proceeded as instructed, the present position at an intersection is inputted at step 289 and processing is terminated.

The present invention is not limited to the above-described embodiment but can be modified in various ways.

For example, though it is described in the above embodiment that destinations and intersections are inputted by entering code numbers, data indicative of Japanese kana characters or Roman letters can be provided as the destination and intersection data and these can be inputted by character retrieval.

Further, it is permissible to adopt an arrangement in which the conventional set-up provided with a distance sensor or steering sensor is combined with the navigation apparatus of the present invention. The resulting system can be adapted in such a manner that, rather than the next geographical point being identified only when a switch is operated by the driver, the navigation apparatus identifies predetermined geographical points automatically by other means and changes over the guidance information delivered to the driver each time.

With a combination of the present invention and the conventional system, it can be so arranged that a region having a simple road network, such as only a single road, is handled by the conventional system having the sensors, while a region having a complicated road network is dealt with by the system of the present invention. It can also be so arranged that the navigation apparatus of the present invention is used as a back-up if the conventional navigation apparatus fails.

It is also possible to provide information relating to the distances between geographical points at which guidance is given, determine distance by a distance sensor and then urge the driver to input the next geographical point (i.e., to make a trigger input) by a voice track or visual display.

Further, in a case where it is arranged so that the driver can set a desired course, such as a route along back roads or a route along a principal road, each geographical point can be provided with information indicating whether the point is on a route of the desired category (i.e., back road or principal road). By designating the category of road desired in the setting of the guidance information, course exploration can be carried out solely in terms of the geographical points along routes of the desired type.

As many apparently widely different embodiments of the present invention can be made without departing from the spirit and scope thereof, it is to be understood that the invention is not limited to the specific embodiments thereof except as defined in the appended claims.

What is claimed is:

1. A vehicular navigation apparatus for outputting guidance information for travel to a destination by an automotive vehicle having a navigation help function, which comprises:
    destination input means for inputting said destination;
    present position input means for inputting a present position;
    help function input means for initiating said navigation help function and inputting a selected help item;
    data base means having map data, intersection data in road data;
    display means for displaying guide information and help information;
    route guide means for setting a guide route by conducting a predetermined processing in accordance with a predetermined sequence based upon said destination and said present position and data from said data base, and delivering to said display means said guide information in accordance with said guide route;
    help function executing means for initiating said help function upon receipt of an input from said help function input means, delivering a menu of a plurality of help items to said display means, receiving said selected help item, and returning to said processing performed by said route guide means at a step corresponding to said selected help item;
    first memory means for storing information corresponding to said guide route; and
    secondary memory means having anon-volatile RAM for storing information stored in said first memory means when said navigation help function is initiated by said help function input means.

2. The apparatus according to claim 1, wherein said help items includes a departure point item and said help function execution means includes means for inputting a departure point and for providing guidance from said departure point, when said departure point item is selected.

3. The apparatus according to claim 1, wherein said help items include a destination change item and said help function execution means includes means or inputting a new destination while said vehicle is en route to a formerly set destination, when said estimation change item is selected.

4. The apparatus according to claim 1, wherein said help items include a lost item and said help function execution means includes means for providing guidance information for returning to said guide route when said lost item is selected while en route to said destination and when a driver of said vehicle cannot determine his present position without returning to a point at which said vehicle went off course.

5. The apparatus according to claim 1, wherein said help items include a road impassable item and said help functioning execution means includes means for providing information about travel along another course when said road impassable item is selected while said vehicle is en route to aid destination.

6. The apparatus according to claim 1, wherein said help items include a road congested item and said help function execution means includes means for changing course and providing information about travel along another course when said road congested item is selected while said vehicle is en route to said destination.

7. The apparatus according to claim 1, wherein said help items include a side trip item an said help function execution means includes means for temporarily leaving said guide route at any point therealong when said side trip item is selected while said vehicle is en route to said destination and then providing information for returning to said guide route at said any point.

8. The apparatus according to claim 1, including trigger means for verifying travel at a point along said guide route by a driver of said vehicle and for providing said verified point to said route guide means, said route guide means updating said guidance information delivered to said display means based on said verified point.

9. The apparatus according to claim 1, wherein said help function execution means includes a means for enabling a driver of said vehicle to input an intersection, displaying via said display means information concerning roads about said intersection together with a landmark relative thereto, and enabling said driver to select a new present position based upon said displayed information.

10. A vehicular navigation apparatus for outputting guidance information for travel to a destination by an automotive vehicle having a navigation help function, which comprises:

an input means having destination input means for inputting a destination, present position input means for inputting a present position, and help function means for initiating and controlling said navigation help function;

memory means for storing information corresponding to said destination, said memory means including a non-volatile RAM means for storing said information corresponding to said destination when said navigation help function is initiated by said help function input means;

display means for displaying information in response to input information from said input means;

and control means for receiving information from said input means, receiving and outputting information to said memory means, and outputting said guidance information to display means; including means for providing a menu of a plurality of help items via said display means when said help function is initiated, receiving a selected help item from said input means, and providing help information via said display means based on said selected help item.

* * * * *